(12) United States Patent
Gross et al.

(10) Patent No.: US 6,263,649 B1
(45) Date of Patent: Jul. 24, 2001

(54) LEAF GATHERING AND COMPRESSING MACHINE AND METHOD

(76) Inventors: Thomas R. Gross, P.O. Box 545; Earl R. Smith, 2409 W. Jordan Rd., both of Mt. Pleasant, MI (US) 48858

( * ) Notice: Subject to any disclaimer, the term of this patent is extended or adjusted under 35 U.S.C. 154(b) by 0 days.

(21) Appl. No.: 09/494,798

(22) Filed: Jan. 31, 2000

Related U.S. Application Data

(60) Provisional application No. 60/118,092, filed on Feb. 1, 1999.

(51) Int. Cl.⁷ .................................................. A01D 47/00
(52) U.S. Cl. ............................................. 56/16.1; 56/16.6
(58) Field of Search ................................ 56/1, 16.1, 16.6, 56/13.2, 202, 341, 342, 362, DIG. 21; 100/100, 145, 150, 189, 904, 65; 141/67, 68, 114; 15/78, 82–86

(56) References Cited

U.S. PATENT DOCUMENTS

| | | |
|---|---|---|
| 2,536,455 | 1/1951 | Miller et al. . |
| 2,656,658 | 10/1953 | Grady . |
| 3,222,853 | 12/1965 | Michael . |
| 3,229,320 | 1/1966 | Cymara . |
| 3,641,754 | 2/1972 | Anstee . |
| 3,664,097 | 5/1972 | Pedigo . |
| 3,736,736 | 6/1973 | Myers . |
| 3,791,118 | 2/1974 | Behrens . |
| 3,922,834 | 12/1975 | Clayton . |
| 4,044,525 | 8/1977 | Forsgren . |
| 4,107,903 | 8/1978 | Wickersheim . |
| 4,223,508 | 9/1980 | Wells . |
| 4,242,171 | 12/1980 | Kauer et al. . |
| 4,379,385 | 4/1983 | Reinhall . |
| 4,446,677 | 5/1984 | Kokido . |
| 4,550,553 | 11/1985 | Gaither . |
| 4,655,128 | 4/1987 | St. Clair . |
| 4,721,545 | 1/1988 | Santorineos . |
| 5,087,463 | 2/1992 | Raudys et al. . |
| 5,155,976 | 10/1992 | Okabe et al. . |
| 5,295,345 | 3/1994 | Ter Haar . |
| 5,343,679 | 9/1994 | Cymara . |
| 5,600,934 | 2/1997 | van Rosendal et al. . |

*Primary Examiner*—Robert E. Pezzuto
(74) *Attorney, Agent, or Firm*—Reising, Ethington, Barnes, Kisselle, Learman & McCulloch, P.C.

(57) ABSTRACT

The leaf gathering and compressing machine has an main frame supported on wheels and adapted to be attached to the drawbar of a tractor. A subframe is pivotally attached to the main frame. A leaf pickup assembly is mounted on the front of the subframe. A leaf feeder assembly with a plurality of augers journaled on the subframe receives leaves from the leaf pickup assembly and conveys the leaves to the rear. A compression auger in an auger housing, mounted on the subframe, receives leaves from the feeder assembly, compresses the leaves and conveys the leaves to the rear. The auger housing has a minimum diameter that is at least two inches larger than the compression auger diameter in a generally vertical transverse plane. A holding container mounted on the main frame communicates with a compression auger discharge.

12 Claims, 3 Drawing Sheets

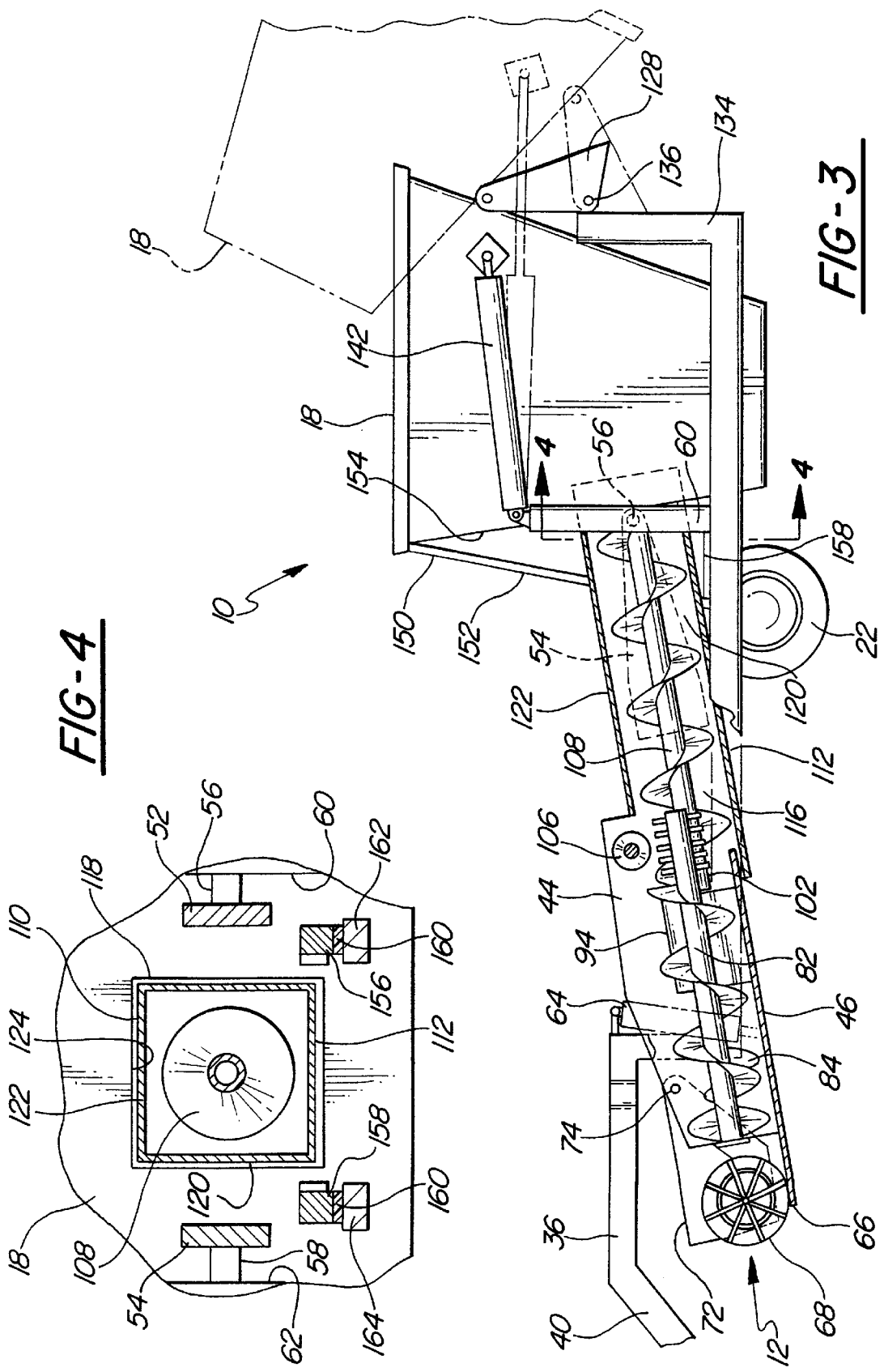

LEAF GATHERING AND COMPRESSING MACHINE AND METHOD

The disclosure incorporates the leaf compressor disclosed in provisional patent application 60/118,092, filed Feb. 1, 1999, whose priority is claimed for this application.

TECHNICAL FIELD

This invention relates to a machine for gathering and compressing leaves and more particularly to a machine that continuously picks up leaves from a leaf windrow, compresses the leaves and delivers compressed leaves to leaf holding container.

BACKGROUND OF THE INVENTION

Municipal governments collect tree and shrub leaves and other yard debris in the fall. This collection is needed because burning of leaves is generally prohibited to improve air quality. Collection, of leaves and other yard debris, is separated, from garbage and general household trash, for composting. By composting yard debris, landfill space is reserved for trash that is not suitable for composting.

Tree leaves and other yard debris are bagged by homeowners for collection in some communities. Such bagging by individuals is an extremely burdensome chore in the fall of the year when trees loose their leaves over a period of a few weeks. The bags are expensive. Raking leaves and stuffing them into bags is hard work and beyond the ability of many older individuals.

The cost and effort required by individuals to bag leaves and yard trash is eliminated in some communities by providing a bulk pickup of such material. When using a bulk pickup system, a homeowner rakes tree leaves and other yard debris onto the side of the street. Generally the leaves and other yard materials are deposited in a windrow adjacent to or on the edge of the street. A vehicle with a collection bin and a vacuum pickup sucks up the leaves and yard debris and holds these materials in the bin. The vacuum pickup tubes are generally manipulated manually while gathering leaves and other material. The bin tends to fill rapidly with leaves that are not significantly compressed. When the bin is full, the machine stops gathering leaves and moves to a disposal site or a transfer station where the bin is unloaded. During transport, unloading and return to the pickup area, the machine is not sucking up leaves and other plant material. This necessary bin unloading procedure can substantially reduce the quantity of leaves and other material gathered during a day.

A number of low capacity leaf and grass clippings bagger attachments have been designed for use on lawn mowing machines. An auger is employed by some of these attachments to feed material into a bag and compress the material in the bag. These mowing machines have limited capacity to pick up leaves. They are slow and frequently plug with leaves. Once the bag is full the mowing machine is stopped, the operator dismounts from the machine, closes the bag manually, removes the filled bag from the machine, mounts an empty bag in position to be filled and then returns to the operator station to resume the bagging operation.

Stationary bagging machines are also used to bag leaves and other plant material. These machines generally have a hopper that feeds leaves into a compression chamber by gravity. Material that is to be bagged is deposited in the hopper manually or by a suitable conveyor.

The bagger attachments for lawnmowing machines and the stationary bagging machines fill relatively small bags. The small bags are handled manually after they are filled. The two major drawbacks of these bagging systems is the cost of the bags and the fact that the systems are very labor intensive.

Attempts have been made to bale leaves with agricultural hay balers. These attempts have been unsuccessful. Leaves are difficult to pick up with baler pickup assemblies because they do not hold together with each other like long stems of hay. Leaves are also difficult to hold together in a bale due to the absence of long stems.

SUMMARY OF THE INVENTION

The leaf gathering and compressing machine has a main frame supported by wheels. The main frame is movable along a leaf windrow. A subframe has a rear portion that is pivotally attached to the main frame. An elongated feed plate on the main frame has a transverse forward edge. A pair of hydraulic cylinders attached to the main frame and to the subframe control the height of the transverse forward edge of the feed plate. A leaf pickup assembly is mounted on the subframe above the transverse forward edge. A leaf feeder assembly on the subframe conveys leaves away from the leaf pickup assembly. A compression auger housed in a tube receives leaves from the leaf feeder assembly. The minimum inside diameter of the tube is at least two inches larger that the diameter of the compression auger. A leaf holding container is in communication with a discharge end of the tube.

The leaf gathering and compression machine compacts a thousand pounds or more of leaves and deposits them in the leaf holding container. When the leaf holding container is full, it is dumped into a transport vehicle.

The leaves are compressed and transported in bulk. No bag material or bag tying materials are required only leaves and tree limbs are delivered to a compose pile.

BRIEF DESCRIPTION OF THE DRAWINGS

The presently preferred embodiment of the invention is disclosed in the following description and in the accompanying drawings, wherein:

FIG. 3 is a sectional view taken along line 3—3 in FIG. 2; and

FIG. 4 is a sectional view of the compression chamber taken along line 4—4 in FIG. 3.

DESCRIPTION OF THE PREFERRED EMBODIMENT

Figure 1:
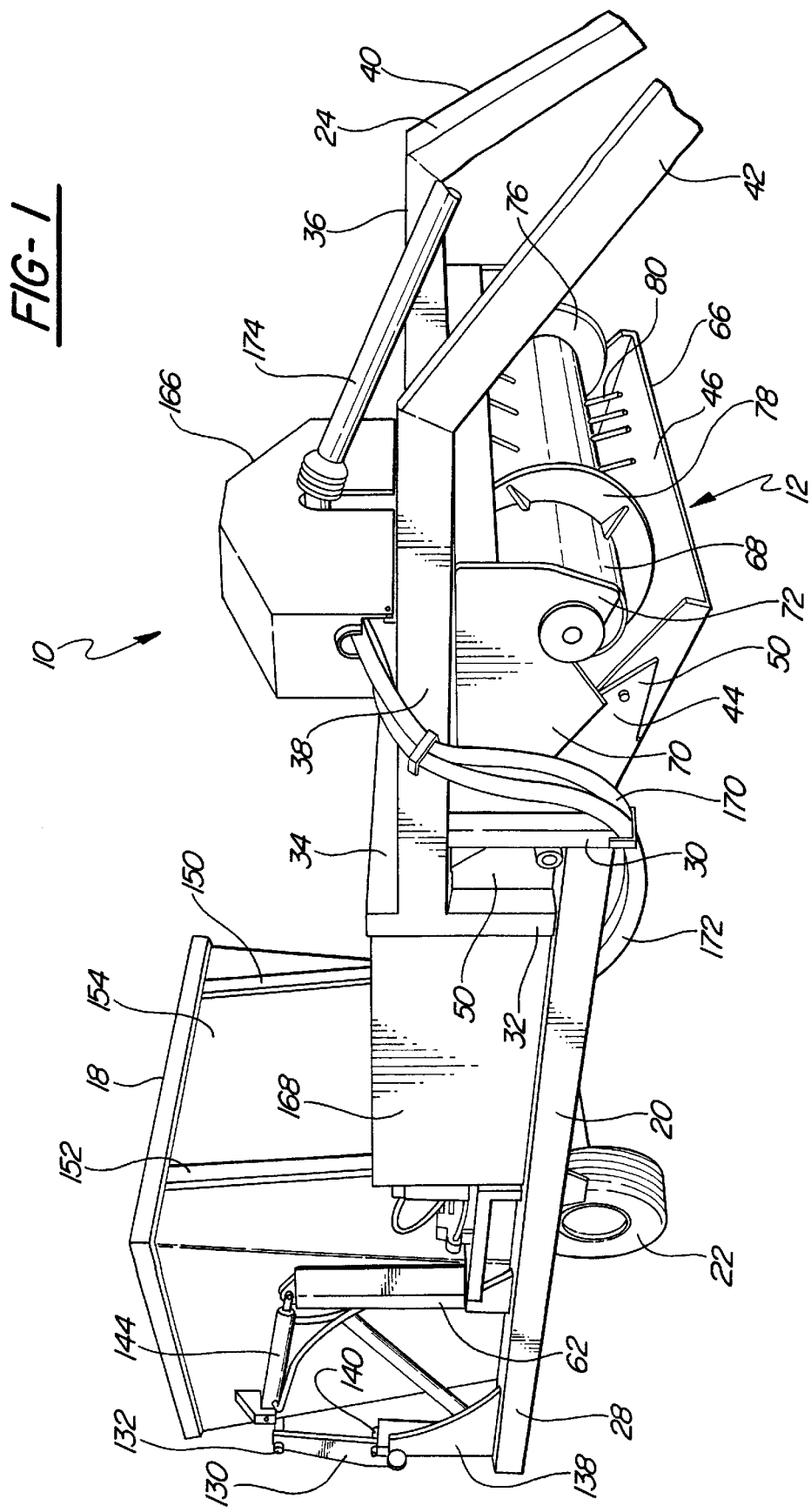
FIG. 1 is a perspective view of the leaf gathering and compressing machine with parts broken away.
Figure 2:
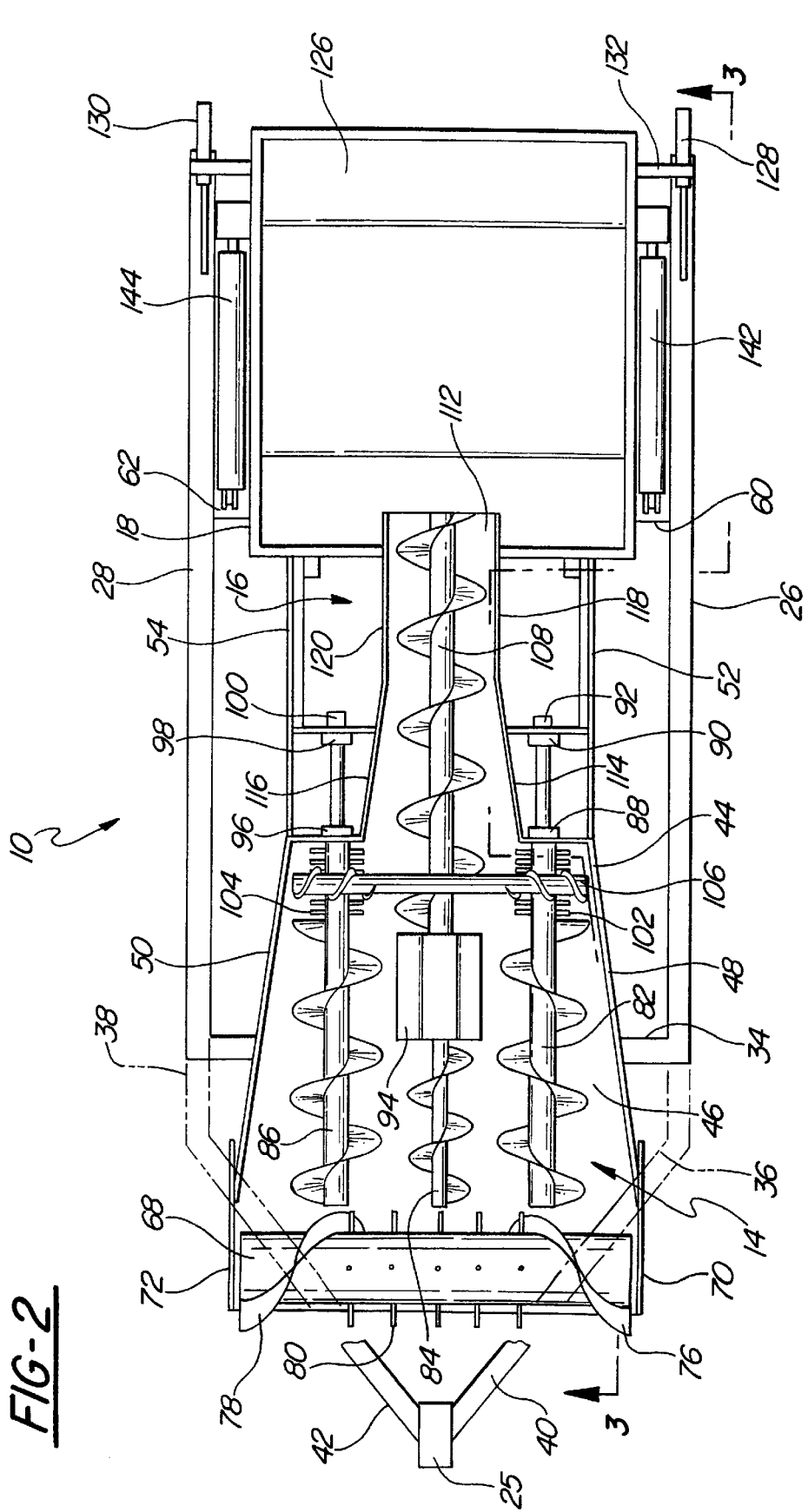
FIG. 2 is a top plan view of the machine with parts broken away to show the gathering, conveying and compressing mechanisms.

The leaf gathering and compressing machine 10 as shown in FIG. 1 has a leaf pickup assembly 12, a leaf feeder assembly 14, a leaf compressor 16 and a leaf holding container 18. These components are mounted on a frame 20 supported by wheels 22. A gooseneck tongue 24 on the front of the frame 20 has a coupler 25 that is adapted to connect the machine 10 to the drawbar of a tractor. The tongue 24 will position the pickup 12 directly behind a tractor. With a pickup 12 directly behind the tractor, the tractor wheels straddle a leaf windrow. A tongue could also be provided on the frame 20 that would position the leaf pickup assembly 12 to one side and to the rear of the tractor.

The frame 20 has a left side rail 26, a right side rail 28 and suitable cross members. A mast has vertical members 30 and 32 fixed to each side rail 26 and 28 and an upper cross beam 34. Fore and aft frame members 36 and 38 are fixed to the vertical members and to the beams 40 and 42 of the tongue 24.

A subframe 44 includes an elongated feed plate 46 with side walls 48 and So and parallel rear frame members 52 and 54. The rear portions of the frame members 52 and 54 are pivotally attached to the frame 20 by trunnions 56 and 58 supported by vertical frame members 60 and 62. Two hydraulic cylinders 64 are connected to the upper cross beam 34 and to each side of the feed plate 46 and the subframe 44. The hydraulic cylinders 64 are expanded and contracted to pivot the subframe 44 about the trunnions 56 and 58 and control the height of the forward edge 66 of the feed plate 46.

The pickup assembly 12 includes a large diameter transverse auger 68. The auger 68 is journaled at each end on auger support arms 70 and 72. The arms 70 and 72 are pivotally attached to the subframe 44 by pins 74 shown in FIG. 3. The auger 68 has auger flighting 76 and 78 that moves leaves toward the center of the feed plate 46 and retractable fingers 80 that move the leaves rearward and up the feed plate. The auger 68 is rotated counterclockwise as seen in FIG. 3 by a hydraulic motor. The retractable fingers are the same as the retractable fingers employed in the augers for grain headers of combine harvesters. The pivot pins 74 permit the auger 68 to raise up when a thick mat of leaves passes between the auger and the feed plate 46.

The leaf feeder assembly 14 includes a left auger 82, a center auger 84 and a right auger 86. The left auger 82 is journaled in bearing 88 and 90 on the subframe 44. A hydraulic motor 92 rotates the auger 82 clockwise as seen from the front. The center auger 84 is supported and driven by a hydraulic motor in the housing 94. The housing 94 is fixed to the subframe 44. The hydraulic motor in the housing 94 preferably rotates the center auger 84 counterclockwise. The right auger 86 is journaled in bearings 96 and 98 on the subframe 44. A hydraulic motor 100 rotates the right auger 86 counterclockwise as seen from the front. The center auger 84 moves leaves to the side augers 82 and 86 when they get to the housing 94. Fingers 102 and 104 move leaves laterally toward the center of the feed plate 46. When the left auger 82 and the right auger are reversed, the fingers 102 and 104 pull material away from the compression auger 108 thereby assisting to unplug the machine 10.

A transverse auger 106, which is above the side augers 82 and 86, moves leaves inward toward the center of the feed plate 46 if there are leaves above the side augers. The auger 106 is driven by another hydraulic motor in a counterclockwise direction as seen from the left side of the machine 10.

A compression auger 108 of the leaf compressor 16 is coaxial with the center auger 84 and is rotatably supported by the housing 94. A hydraulic motor in the housing 94 drives both of the augers 84 and 108 supported by the housing. The auger 108 is inside a rectangular tube 110 that is attached to the subframe 44. The bottom wall 112 of the tube 110 is in a plane. The front wall portions 114 and 116 of the tube 110 converge from the front to the rear and form a funnel portion. The rear wall portions 118 and 120 of the tube 110 are parallel. The top wall 122 of the tube 110 is parallel to the bottom wall 112.

The rear portion of the tube 110 as shown in FIG. 4, is rectangular. The tube 110 can have other shapes. Leaves can stick to the auger 108 and rotate in a circular tube. Wall projections can be provided to retard rotation of the leaves relative to the tube 110. If the tube 110 is non-circular leaves will generally not rotate about the axis at the tube 110. The tube 110, as shown in FIG. 4, is about 20% larger in width and height than the diameter of the auger 108. A minimum clearance between the auger 108 and the wall of the tube 110 between one inch and five inches is acceptable. This difference in size and the resulting space between the periphery of the flighting on the auger 108 and the walls of the tube 110 tends to retard movement of the leaves and increases compaction of the leaves.

The discharge end of the tube 110 extends through an opening 124 and into the leaf holding container 18. It has been found that leaves discharged from the tube 110 and the compaction auger 108 and deposited in the holding container 18 tend to remain compacted.

The leaf holding container 18 has a rear wall 126 that is pivotally attached to arms 128 and 130 by a shaft 132. The arm 128 is pivotally attached to an upright 134 of the frame 20 by a pivot pin 136. The arm 130 is pivotally attached to an upright 138 of the frame 20 by a pivot pin 140.

Left and right hydraulic cylinders 142 and 144 are attached to the leaf holding container 18 and to left and right uprights 60 and 62 on the frame 20. Two vertical supports 150 and 152 on the front wall 154 of the container 18 have lower ends connected to beams 156 and 158 that extend forward from a lower portion of the front wall. These beams 156 and 158 both set on low friction bumpers 160, on beams 162 and 164 of the frame 20 when the holding container is in the loading position. When the container 18 is full of compacted leaves, the cylinders 142 and 144 are extended. The arms 128 and 130 pivot toward the broken line dump position shown in FIG. 3 and the container 18 moves horizontally to the rear. After the container is clear of the tube 110, the arms 128 and 130 contact stop surfaces on the uprights 128 and 130, the arms stop pivoting and the container 18 pivots to a dump position. Retracting the cylinders 142 and 144 reverses the movement described above and returns the container to the loading position.

A hydraulic pump in the housing 166 on top of the frame members 36 and 38 receives hydraulic fluid from a tank 168 through a pipe 170 and delivers fluid under pressure to the hydraulic motors and cylinders through a pipe 172. Control valves are provided to control fluid flow. The hydraulic pump is driven by a driven shaft 174. The driven shaft 174 is connected to a tractor power takeoff shaft.

Leaf pickup assembly 12 and the leaf feeder assembly 14 are covered. As a result of the cover leaves are enclosed from the time they pass under the auger 68 until they are discharged into the leaf holding container 18. Access doors are provided for maintenance and cleaning.

The disclosed embodiment is representative of a presently preferred form of the invention, but is intended to be illustrative rather than definitive thereof. The invention is defined in the claims.

We claim:

1. A leaf gathering and compressing machine comprising:

a main frame supported by wheels and adapted to be moved along a path parallel to a leaf windrow;

a subframe with a rear subframe portion pivotally attached to the main frame for pivotal movement about a generally horizontal axis that is transverse to said path;

an elongated leaf feed plate mounted on the subframe and having a transverse forward edge;

a pair of height control hydraulic cylinders attached to the main frame and a forward portion of the subframe for pivoting the subframe relative to the main frame and controlling the height of the transverse forward edge;

a leaf pickup assembly mounted on the subframe above the transverse forward edge of the elongated feed plate;

a leaf feeder assembly mounted on the subframe above the elongated leaf feed plate that receives leaves from the leaf pickup assembly and conveys the leaves along the elongated leaf feed plate;

a leaf feeder assembly mounted on the subframe above the elongated leaf feed plate that receives leaves from the leaf pickup assembly and conveys the leaves along the elongated feed plate;

a compression auger rotatable mounted on the subframe and housed in a tube that provides a minimum clearance between the compression auger and an inside surface of the tube of at least one inch and wherein the compression auger receives leaves from the leaf feed assembly, compresses the leaves and conveys the leaves to a tube discharge end; and a leaf holding container carried by the main frame and in communication with the discharge end of the tube.

2. A leaf gathering and compressing machine as set forth in claim 1 wherein the leaf pickup assembly includes a transverse auger journaled on the subframe, having an elongated pickup tube, auger flighting on both ends of the elongated pickup tube that moves leaves toward the center of the elongated feed plate and retractable fingers in a center portion of the transverse auger that moves leaves rearward.

3. A leaf gathering and compressing machine as set forth in claim 1 wherein the leaf feeder assembly includes an auger support housing attached to the subframe, a center auger journaled in the auger support housing and extending forward to the leaf pickup assembly, a left feed auger journaled on the subframe to the rear of the auger support housing and to the left side of the center auger, and a right feed auger journaled on the subframe to the rear of the auger support housing and to the right side of the center auger.

4. A leaf gathering and compressing mechanism as set forth in claim 1 wherein the tube that houses the compression auger has a non-cylindrical cross section.

5. A leaf gathering and compressing machine as set forth in claim 1 wherein a portion of the tube that houses the compression auger has a rectangular cross section.

6. A leaf gathering and compressing machine as set forth in claim 3 wherein the compression auger is journaled in the auger support housing and is coaxial with the center auger.

7. A leaf gathering and compressing machine comprising:

a main frame supported by wheels and having an integral hitch adapted to be connected to a tractor;

a subframe having a rear portion pivotally attached to the main frame for pivotal movement about a horizontal axis that is transverse to a fore and aft axis of the subframe;

a pair of hydraulic cylinders connected to the main frame and to the subframe that are operable to pivot the subframe relative to the main frame;

a leaf pickup assembly including a pickup feed plate with a transverse forward edge fixed to the subframe, a transverse auger journaled on the subframe above the transverse forward edge of the pickup feed plate and movable vertically toward and away from the pickup feed plate, and a pickup assembly transverse auger drive operable to rotate the transverse auger;

a leaf feeder assembly for receiving material from the leaf pickup assembly and conveying the material rearward including a feeder assembly feed plate mounted on the subframe and extending rearward from the pickup feed plate, an auger drive housing mounted on the subframe and extending upward from the feed assembly feed plate, a center auger journaled in the auger drive housing and extending forward above the feed assembly feed plate to a discharge end of the leaf pickup assembly, a left auger journaled on the subframe to the rear of the auger drive housing and extending forward above the feed assembly feed plate to the discharge end of the leaf pickup assembly, a right auger journaled on the subframe to the rear of the auger drive housing and extending forward above the feeder assembly feed plate to the discharge end of the leaf pickup assembly, a left auger drive, a center auger drive and a right auger drive that rotate the left auger, the center auger and the right auger about separate axes that are parallel to said fore and aft axis of the subframe;

a leaf compressor including a compression auger that is rotatably journaled in the auger drive housing, coaxial with the center auger, extends rearwardly from said auger drive housing and is driven by said center auger drive, and a compression auger tube that houses the compression auger, is mounted on the subframe, is non-cylindrical, receives leaves from the left auger and the right auger of said feeder assembly, has a minimum tube inside dimension in a transverse plane through a compression auger axis that exceeds a compression auger diameter by at least two inches; and a leaf holding container mounted on the main frame that is in communication with a discharge end of said leaf compressor.

8. A leaf gathering and compressing machine as set forth in claim 7 wherein the left end and the right end of the transverse auger are journaled on auger support arms and the auger supports arms are pivotally attached to the subframe.

9. A leaf gathering and compressing machine as set forth in claim 7 including a driven compression auger feeder journaled on the subframe to the rear of the auger drive housing, above a left auger discharge end and a right auger discharge end of the leaf feeder assembly, and flighting on the ends of the driven compression auger feeder that feed leaves toward the compression auger.

10. A leaf gathering and compressing machine as set forth in claim 7 wherein said horizontal axis of the attachment of the subframe to the main frame, intersects a compression auger axis.

11. A leaf gathering and compressing machine as set forth in claim 7 wherein the leaf holding container is a metal container that is pivotally attached to the main frame and the compression auger tube passes through an opening in a wall of the leaf holding container.

12. A leaf gathering and compressing method comprising:

sliding a forward edge of a feed plate under a pile of leaves;

conveying the pile of leaves up the feed plate to a compression auger;

compressing leaves by conveying them through a non-circular tube with a compression auger having a diameter that is at least two inches smaller than the width of the rectangular tube;

forcing compacted leaves through an aperture in a lower portion of a leaf container wall; and compacting the leaves in the leaf container.

* * * * *

UNITED STATES PATENT AND TRADEMARK OFFICE
CERTIFICATE OF CORRECTION

PATENT NO. : 6,263,649 B1
DATED : July 24, 2001
INVENTOR(S) : Thomas R. Gross et al.

It is certified that error appears in the above-identified patent and that said Letters Patent is hereby corrected as shown below:

<u>Column 3,</u>
Line 6, change "So" to -- 50 --.

<u>Column 5,</u>
Delete lines 9-12.

Signed and Sealed this

Fourteenth Day of May, 2002

Attest:

JAMES E. ROGAN
*Attesting Officer*     *Director of the United States Patent and Trademark Office*